United States Patent [19]

Pecori

[11] 4,213,093
[45] Jul. 15, 1980

[54] PORTABLE BURIED OBJECT DETECTION SYSTEM WITH ERROR REDUCING SIGNAL PROCESSING

[75] Inventor: Peter M. Pecori, Alexandria, Va.

[73] Assignee: The United States of America as represented by the Secretary of the Army, Washington, D.C.

[21] Appl. No.: 923,511

[22] Filed: Jul. 10, 1978

Related U.S. Application Data

[63] Continuation-in-part of Ser. No. 774,574, Mar. 4, 1977, abandoned.

[51] Int. Cl.² .............................................. G01V 3/08
[52] U.S. Cl. .................................................... 324/329
[58] Field of Search ..................................... 324/3, 6, 8

[56] References Cited
U.S. PATENT DOCUMENTS

| | | | |
|---|---|---|---|
| 3,823,365 | 7/1974 | Anderson | 324/3 |
| 3,826,973 | 7/1974 | Pflaum | 324/3 |
| 3,828,242 | 8/1974 | Vann | 324/3 |
| 3,836,842 | 9/1974 | Zimmermann et al. | 324/3 X |
| 4,021,725 | 5/1977 | Kirkland | 324/3 |
| 4,024,468 | 5/1977 | Hirschi | 324/3 |
| 4,030,026 | 6/1977 | Payne | 324/3 |
| 4,044,299 | 8/1977 | Weber | 324/3 |

*Primary Examiner*—Gerard R. Strecker
*Attorney, Agent, or Firm*—Nathan Edelberg; Robert P. Gibson

[57] ABSTRACT

A portable apparatus used for geophysical exploration for buried objects such as mines, relics and minerals utilizing a means to represent the endpoints of the apparatus sweep and means responsive thereto to blank data received at these points, thereby eliminating erroneous signals likely to occur when the search head is in a tilted position. The end-point representation may be achieved by either a metronome-type signal generator or by an accelerometer.

4 Claims, 7 Drawing Figures

PORTABLE BURIED OBJECT DETECTION SYSTEM WITH ERROR REDUCING SIGNAL PROCESSING

GOVERNMENT USE

The invention described herein may be manufactured, used and licensed by or for the Government for Governmental purposes without the payment to me of any royalties thereon.

CROSS REFERENCE TO RELATED APPLICATION

This is a continuation-in-part of patent application Ser. No. 774,574, filed Mar. 4, 1977, now abandoned.

BACKGROUND OF THE INVENTION

This invention relates to portable apparatus used for geophysical exploration for buried objects such as mines, relics and minerals and, in particular, to improved means to avoid the effect of erroneous signals in hand-held devices of this type.

Present portable detector apparatus operate based on the transmission of microwave energy into the ground and subsequent reception of the returning signal. A buried object will affect the energy levels at the receiving antenna in a fashion which differs from the response over a homogeneous medium. However, another factor which will affect the receiving antenna response level is whether the antenna is parallel to the ground. If the antenna is tilted with respect to the ground, a change in signal level will be observed at the receiving antenna. This is due to distance differences to the ground between transmitting dipoles in certain systems, and antenna energy decoupling in other systems. The net result is an unwanted increase in signal levels proportional to the amount of tilt. In portable detector systems, the antenna is mounted at the end of a rigid handle which is swung in an arc by the operator. Normal operation will result in the antenna being tilted at the endpoints of the arc where the operator has stopped and is starting his motion in an opposite direction. As a consequence, false signals are received at these endpoints which can result in objects going undetected or in erroneous indications of the presence of a buried object.

SUMMARY OF THE INVENTION

The present invention provides a portable detection device with an improved signal processing system that corrects for the aforementioned problem of increased signal levels at the sweep endpoints. In this invention error reduction is achieved by a pulse blanking logic that is triggered by a sweep endpoint indicating means.

DESCRIPTION OF THE PREFERRED EMBODIMENT

Figure 1:
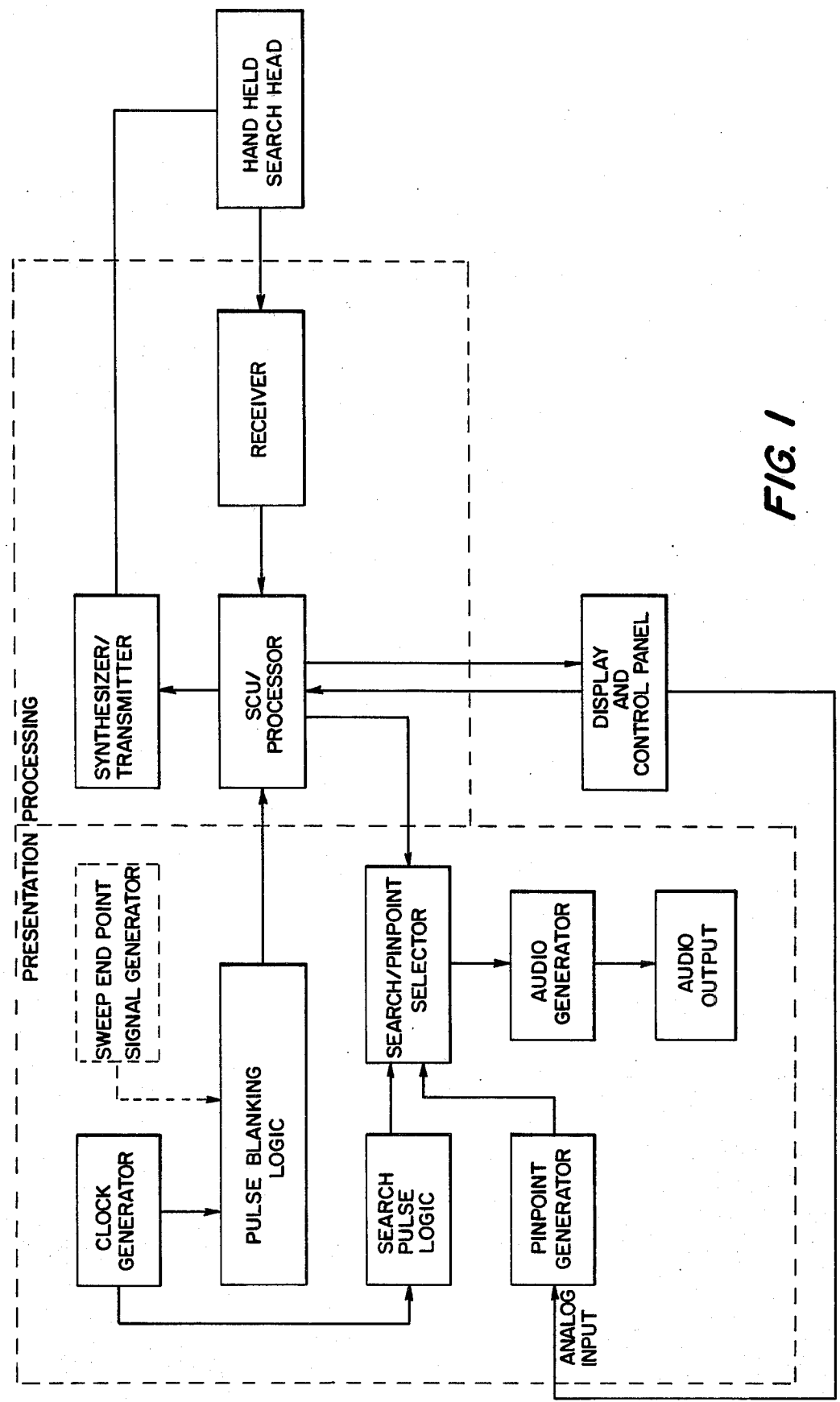
FIG. 1 is a block diagram of a detector system embodying the invention.

With reference to FIG. 1, the detector is composed of three basic components, i.e., the Presentation electronics, shown in the left side dotted portion of the diagram in FIG. 1, the Processing electronics, shown in the center dotted portion of the diagram, and the Hand-Held Search Head identified as such in the far right blocks. The concept and circuitry for electronic detection of buried objects is well known and any suitable electronics may be utilized for carrying out the teachings of this invention since the elements per se are known and only their organization so as to enable them to perform the described functions is new.

The specific nature of the device is best explainable with reference to its operation. Considering first the Presentation side of FIG. 1, it can be seen that a Clock Generator will produce a periodic signal at a regular rate. This rate is adjustable but, in most cases, a frequency of one signal every two or three seconds is preferable. The signal from the Clock Generator, which contains a crystal oscillator, is fed to the Search Pulse Logic which performs appropriate pulse shaping of the signal which is then received by the Search/Pinpoint Selector, The Search/Pinpoint Selector is a switching circuit which controls which signal will be presented audially to the operator. In the first or search mode, which is used prior to target detection, the signal from the Clock Generator is permitted to travel to the Audio Generator and produces an audio output in the form of a metronome-type clicking. This steady clicking enables the user to pace his sweep of the Search Head at a rate required for the processing components to accurately perform their target detection function.

During the search mode, the SCU (System Control Unit)/Processor emits a control voltage to the Synthesizer/Transmitter which produces an RF signal that travels to the Hand-Held Search Head, which is basically an antenna. The output of this antenna feeds the Receiver, which is of the conventional detector type. The receiver detects and digitizes the input from the Search Head, which is a function of the degree of relative balance or unbalance detected by the antenna, and then feeds this output to the SCU/Processor for processing. Processing is achieved by a mini-computer, such as a CDC Model 469 mini-computer, which is programmed to perform a processing algorithm that essentially develops a background value in terms of the mean and standard deviation for a specified number of sweeps of the Search Head. Processing is additionally achievable by micro processors. The input to the control panel from the processor is a signal level which is related to the magnitude of the processing data algorithm. The background value is continuously updated during each sweep by the processor and the signal received from the Receiver is compared against this background value. A received signal outside the threshold level of variance from the mean will indicate the presence of a buried object and will trigger the second or pinpoint mode.

As previously noted, the data input at the end of each sweep will usually be erroneous due to the increased signal level resulting from the head's tilted orientation at these points which, if the device is being properly used, occur at or near the point in time that the signal is produced by the Clock Generator. Therefore, by feeding the signal from the clock Generator to the Pulse Blanking Logic, in addition to the Search Pulse Logic, the occurrence of this pulse is used to prevent utilization of any of the data from the Receiver in the time frame in which the Search Head is tilted at the sweep endpoints by the SCU/Processor in formulating the background information. It should be noted that no novel blanking circuitry is contemplated or required for the Pulse Blanking Logic, and various forms of circuits for inhibiting entry of data to the processor during the blanking period without affecting the data received during the majority of the sweep arc will be obvious to those of ordinary skill in the art.

When the second mode is triggered, a signal from the SCU/Processor sets off an indicator signal on the control panel to indicate the shift in mode and transmits an anolog input to the Pinpoint Generator as well as a shift command to the Search/Pinpoint Selector which stops the metronome signal and feeds the signal from the Pinpoint Generator to the Audio Output. The analog input is developed by a comparison between the stored background value and the received signal, and is converted by the Pinpoint Generator into a signal that produces a Geiger-type variable rate clicking audio output. The click rate may vary from the 2 per second search mode rate to as high as 40–50 clicks per second when the target is pinpointed in the second mode. After a target is pinpointed, the search mode can be reinstituted by means of a reset switch (not shown).

An alternative means to indicate the sweep arc endpoints and trigger the Pulse Blanking Logic is shown in phantom in FIG. 1. In this alternative embodiment (which need not be used with a metronome-type pacing system), a separate Sweep Endpoint Signal Generator is utilized which detects the end of the sweep and generates a signal in response thereto. For example, an accelerometer can be mounted to the Hand-Held Search Head. Such that when the accelerometer detects zero velocity as the direction is reversed at the arc endpoint, a signal is generated that triggers the Pulse Blanking Logic in the same manner as was noted with respect to the first embodiment.

It will now be appreciated that the present invention utilizing the described pulse blanking technique will provide a detection device that avoids the problems of the prior art systems with respect to false alarms and missed signals attributable to the normal angularity of the search head detecting antenna at the end of the sweeping arc.

Figure 2A:
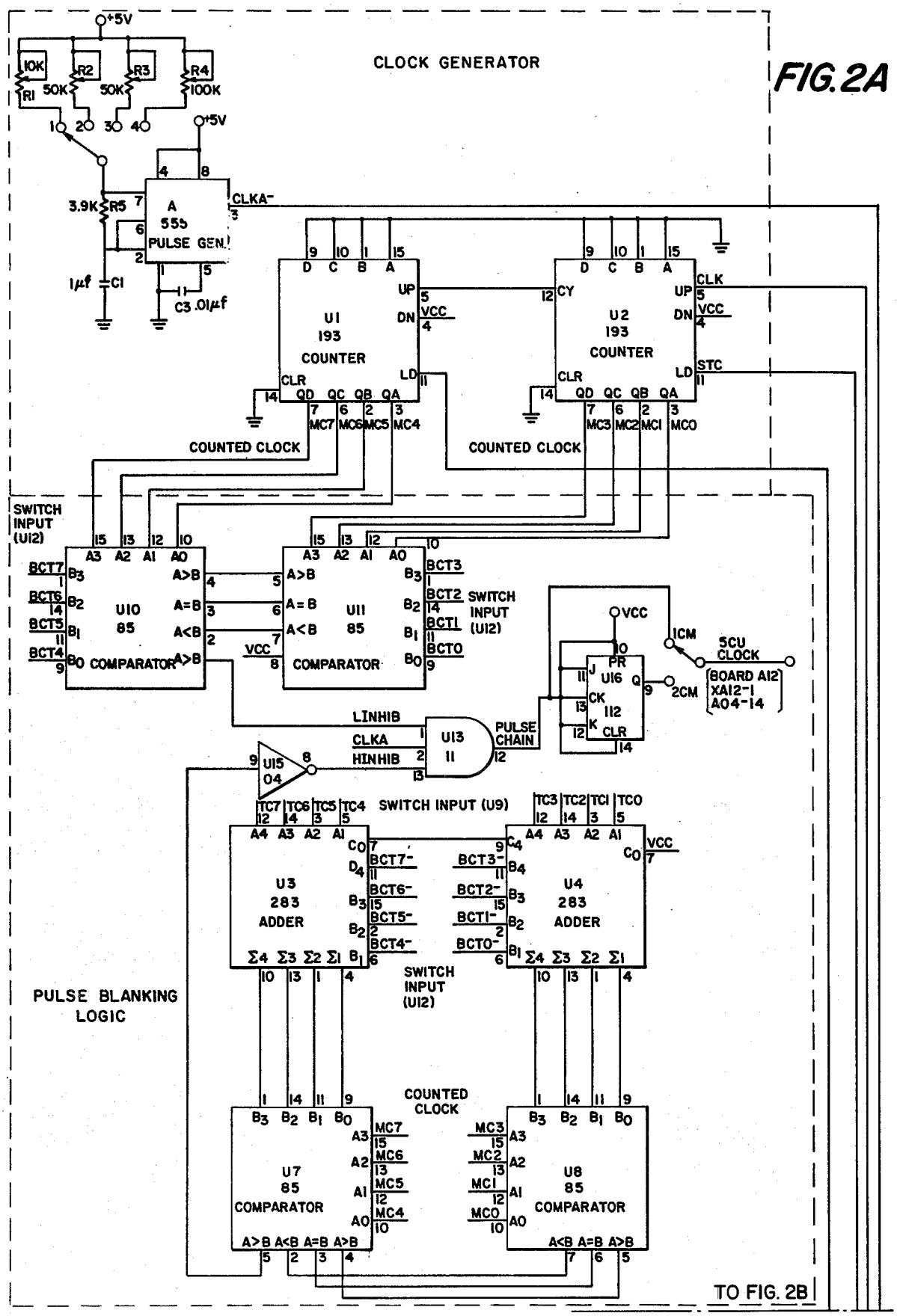
FIGS. 2A and 2B are more detailed circuitry of the Presentation electronics portion of the block diagram of FIG. 1.
Figure 2B:
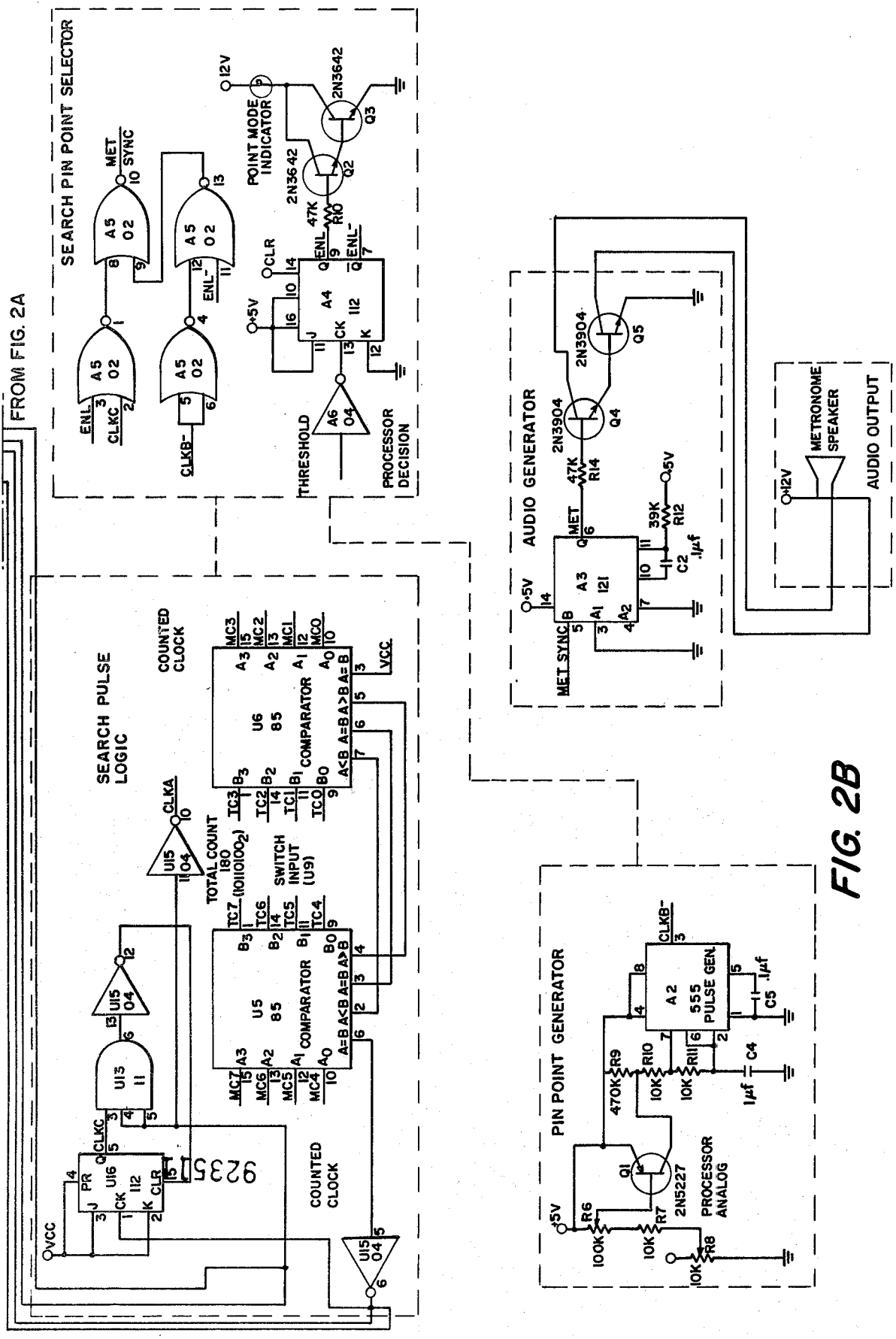
Figure 3:
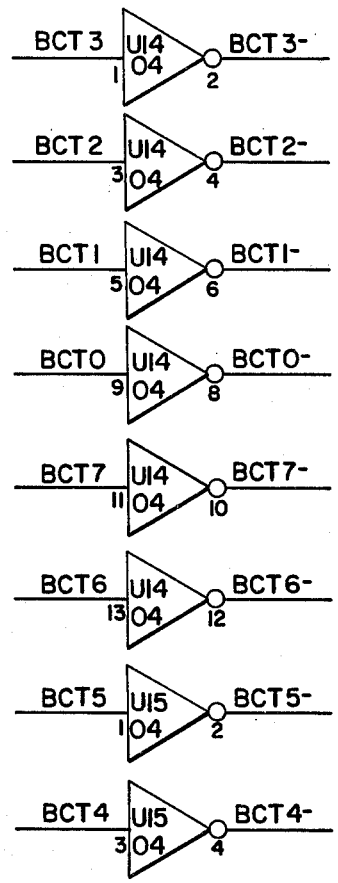
FIG. 3 shows the details of the inverter used in the system.
Figure 2C:
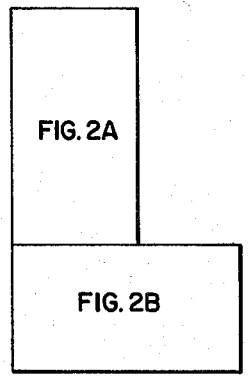
FIG. 2C shows the general block diagram relationship of FIGS. 2A and 2B.

With reference now to FIG. 2, a more detailed description in given. A periodic signal CLKA is produced by the pinpoint generator A1 of the type manufactured by Signetics Corporation.

This periodic signal is presented to two cascaded 4-Bit Up/Down counters. U1 and U2 manufactured by Texas Instruments. The periodic signal is presented to the count up port, pin 5 of U2, and after an external loading signal is received at pin 11, the signal is counted. The counted clock output is presented at pins 2, 3, 6 and 7, of U1 and U2 for use by the Pulse Blanking Logic and the Search Pulse Logic.

Figure 4:
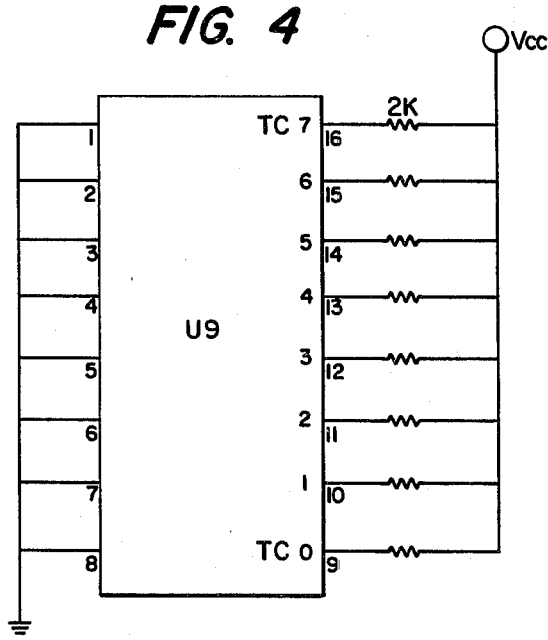
FIG. 4 is a detail of switch input U9.

The Search Pulse Logic receives the counted clock output from U1 and U2 at pins 10, 12, 13 and 15 of U5 and U6, 4-Bit comparators, made by Texas Instruments. An externally mounted 8-Bit preset microswitch, U9, such as shown in FIG. 4, is connected to pins 1, 9, 11 and 14 of said comparators. A binary number is then selected by means of the manually controlled switch. This presents voltage levels to said comparator. When the voltage levels from the counted clock output equal the present levels, an equality (A=B) output will be present at pin 6 of U5. By this means a predetermined number of clock pulses can be used to determine the metronome interval. This metronome interval signal is generated as clock C from U16, a J-K flip flop, made by Texas Instruments, controlled by the equality condition signal from U5. Clock A, the high speed clock, is implemented as the control clock for the SCU/Processing section upon qualification from the Pulse Blanking Logic. The net result of the Search Pulse Logic is to appropriately shape the clock Generator signal by slowing the high speed clock rate necessary for digital integrated circuit operation down to a useable speed for human audial interpretation.

Figure 5:
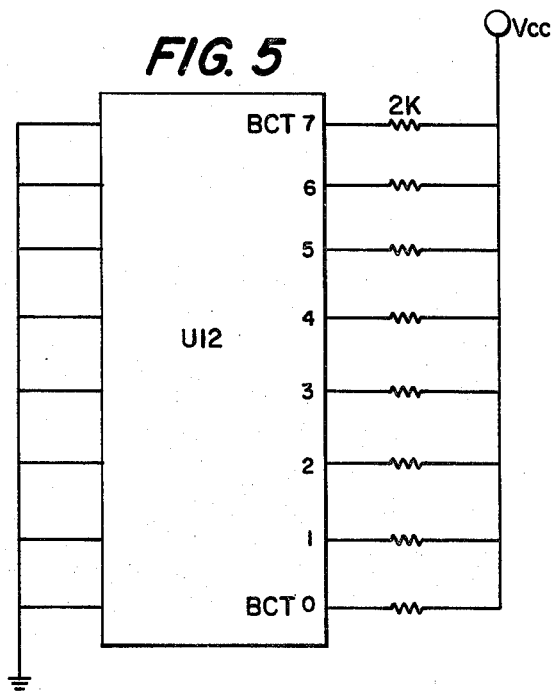
FIG. 5 is a detail of switch input U12.

The counted clock output from U1 and U2 is additionally presented to the Pulse Blanking Logic at pins 10, 12, 13 and 15 of U7, U8, U10 and U11 which are also 4-Bit comparators. At U10 and U11 an additional external preset 8-Bit microswitch, U12, such as shown in FIG. 5, is connected to pins 1, 9, 11 and 14. A smaller value than the number used in U9 is then selected at U12. When the clock count exceeds this small number, a signal is issued at pin 5 of U10. This signal is presented to an AND gate U13, along with the high speed clock, CLOCK A.

Additionally, the inverted switch inputs from U12 are presented to pins 2, 6, 11 and 15 of U3 and U4, two 4-Bit adders, made by Texas Instruments. The switch inputs are inverted at U14. The result presented at the sum ports of the U3 and U4, i.e., pins 1, 4, 10 and 13, is the difference between the total switch count of U9 and the partial switch count of U12. This result from U3 and U4 is presented at U7 and U8, which are 4-Bit comparators. This input is presented at pins 1, 9, 11 and 14 of U7 and U8. The counted clock output is presented to the other input ports of the comparators, 10, 12, 13 and 15. As before, the signals are compared, and when counted clock output exceeds the switch count from U3 and U4 an inhibit pulse is issued from pin 5 of U7 and is presented to said AND gate, U13. The operation of this Pulse Blanking Logic is as follows. In the absence of an inhibit pulse from U7 or U10, clock A, the high speed digital clock, will be passed through the AND gate U13 and presented as the system clock for the SCU/Processing sections. If the number of clock pulses does not exceed a certain minimum number as determined by U9, then an inhibit signal will be issued from U10 to the AND gate U13. This will blank the pulse output and prevent processing by the mini-computer or microprocessor in the SCU/Processor section. Likewise, if the number of clock pulses exceeds a certain present maximum number determined by U9 and U12, an inhibit pulse will be issued from U7 which will again blank the clock A signal and prevent processing. As the switch count from U9 represents the period of time necessary for the operator to swing the search head from one end point to another, and as the operator has synchronized his reaching these endpoints with an audible signal representing this period as provided by clock C, the search head antenna will be at the sweep endpoints at the beginning and end of the switch count controlled by U9. Therefore, U12 will control the amount of blanking done at the beginning of the sweep via U10 and at the end of the sweep via U7. This particular blanking design, employing external present 8-Bit switches, was chosen for ease of parameter variation in the field testing stage of the device.

The output from the Search Pulse Logic, clock C, is presented as one input to the Search/Pinpoint Selector. The Search/Pinpoint Selector, A5, is a Quad NOR gate, made by Texas Instruments. The other input is obtained from the Pinpoint Generator. The Pinpoint Generator receives the analog representation of the processed data from the SCU/Processor section via the Display and Control Panel and digitizes it by a timer A2 operated as pulse position modulator. This changes an analog input signal into a Geiger counter-like output, where pulse repetition rate is a function of the analog signal voltage level. This signal is represented as clock B. This signal is presented to the Search/Pinpoint Selector at pins 5 and 6 of A5. The Search/Pinpoint Selector also receives the processing decision signal from the SCU/Processor as to whether the processed data has exceeded the threshold level determined to be necessary to classify the signal as a target. The signal is presented to J-K flip flop A4 which produces the Enable signal if the threshold signal has been received and the Enable signal if the Threshold signal has not been received. An externally controlled clear signal is presented at pin 14 of A4 to clear the device after a threshold signal has been received. The enable signal is used to control a display light indicating an alarm condition and at the NOR gates A5. When the Enable signal is present indicating a target, clock B will be outputted as the audio output signal. This clock is proportional to the processed signal strength and is used to pinpoint or outline the target. If the Enable signal is not present, clock C will be outputted to the audio output section to control the operators pacing of his sweep.

The Audio Output Section involves conventional audio circuitry including a one shot multivabrator, made by Texas Instruments, to drive a speaker.

The balance of the system involves standard circuitry. The SCU/Processor may be a CDC 469 minicomputer or microprocessor device. The control functions include timing and frequency command of transmitter, control of the detected and digitized RF signal from the receiver to the Processor, timing for the Processor, and out-putting the processed data. Processing functions have been described in the specification.

The Search Pulse Logic output signal is employed as the control clock for the SCU/Processor. This signal is employed as the interrupt controller for the central processing unit and will determine when the CPU will actively process data. For example, if a micro-processor device, such as Texas Instruments model 9900 is employed, the control signal would be presented at the HOLD input. This input serves as an interrupt controller to the Central Processing Unit and controls the processing interval. During normal operation, data will be processed until the receipt of inhibit signals from either U7 or U10, indicating that the blanking interval is present.

I claim:

1. In a device for detecting objects buried within the earth's surface of the type that is swept back and forth in an arc over the ground to be searched, the improvement comprising:
   a. means for generating a signal representing the endpoints of the sweep arc;
   b. means for transmitting a signal into the ground and receiving a returning signal from the ground;
   c. means connected to said means for transmitting and receiving for processing said returning signal and for developing a background level for use in creating a triggering detection threshold; and
   d. means connected to said means for generating a signal and connected to said means for processing and developing, for preventing said returning signal from being utilized in creating said detection threshold in response to receiving an endpoint representing signal therefrom.

2. The device for detecting of claim 1 wherein said means for preventing is a pulse blanking logic circuit.

3. The device of claim 2 wherein said means for generating a signal is a metronome-type pacing signal generator.

4. The device of claim 2 wherein said means for generating a signal includes an accelerometer mounted so as to be swung back and forth with said means for transmitting and receiving.

* * * * *